UNITED STATES PATENT OFFICE.

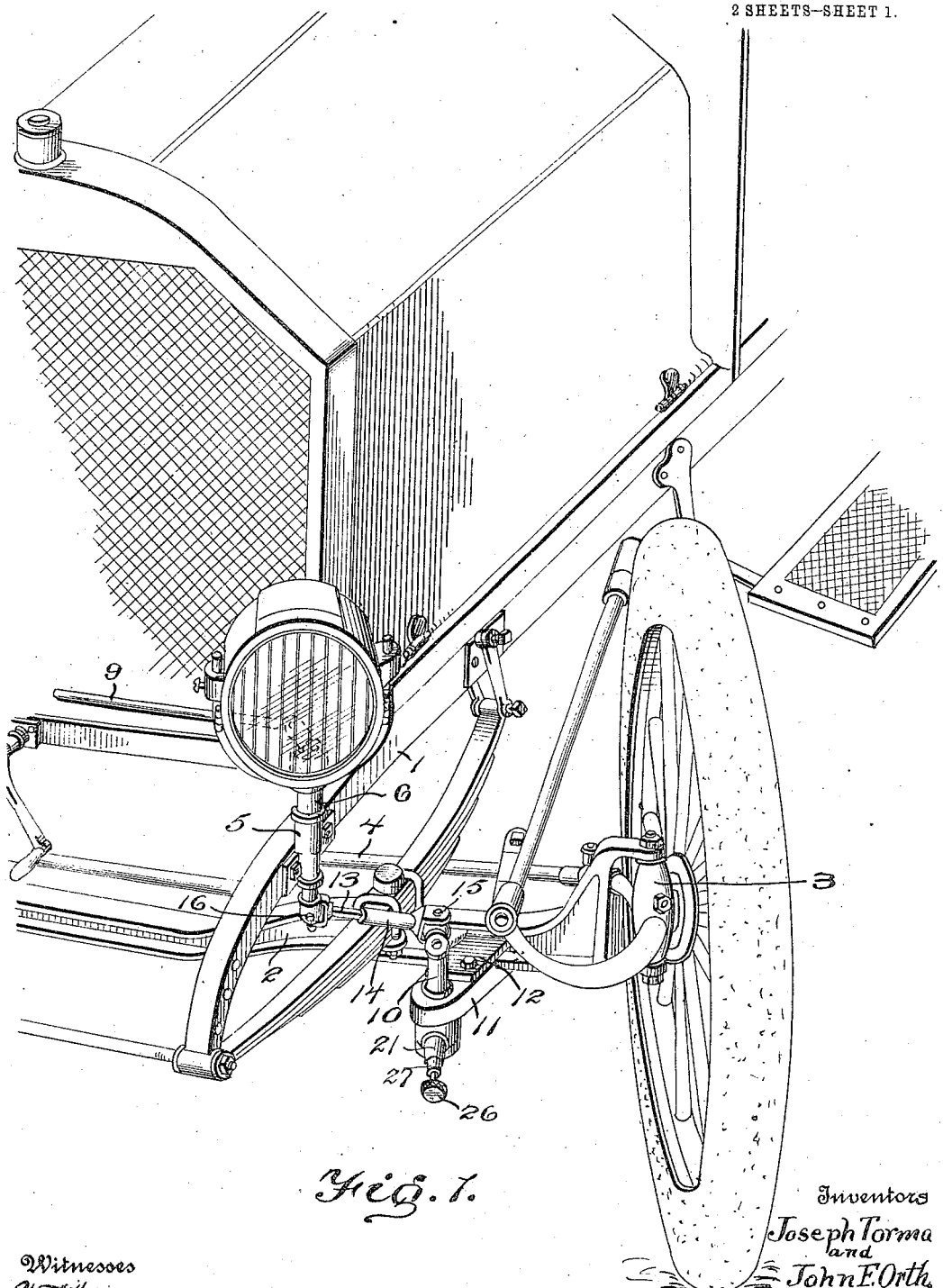

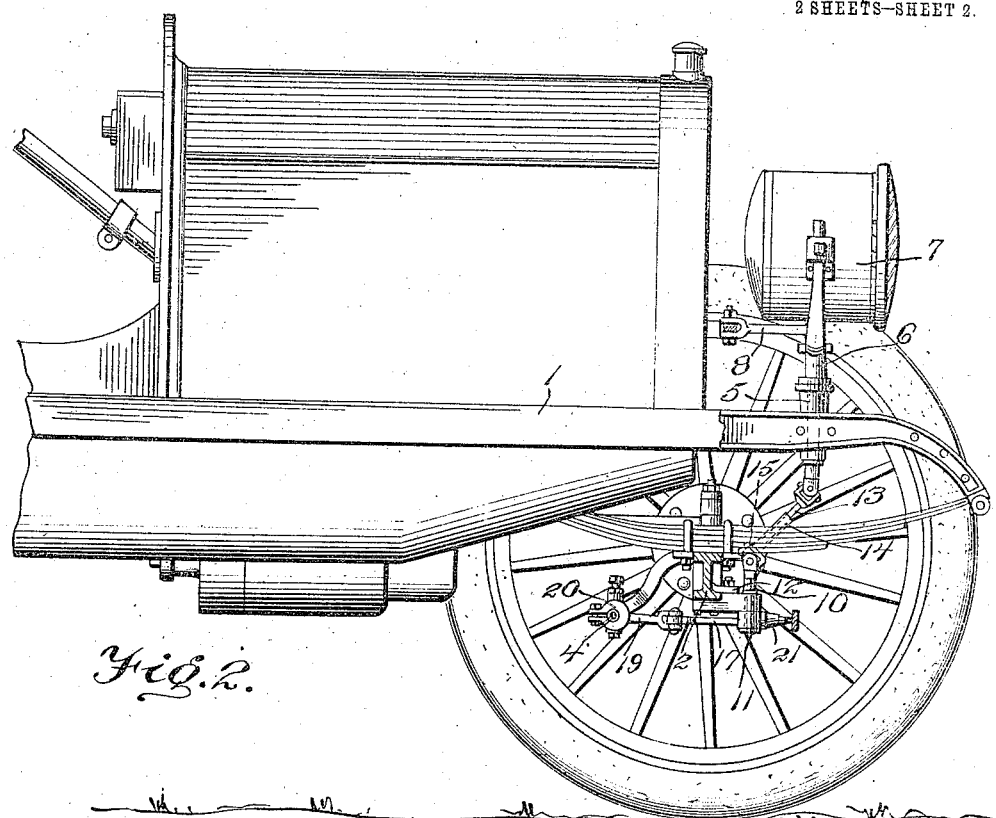
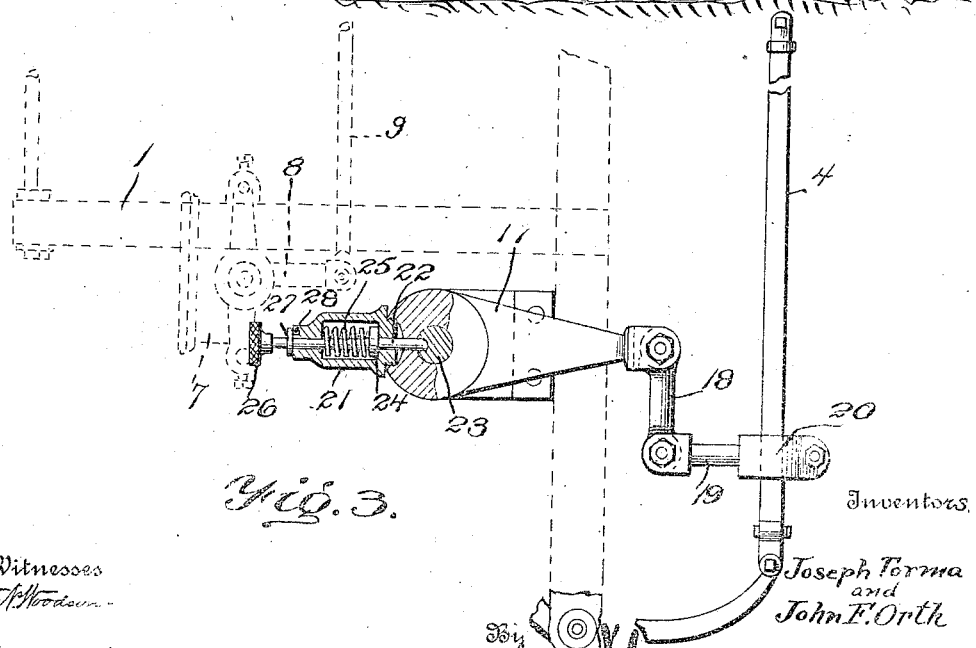

JOSEPH TORMA AND JOHN F. ORTH, OF EAST PITTSBURGH, PENNSYLVANIA.

HEADLIGHT-CONTROLLING DEVICE.

1,011,278.

Specification of Letters Patent.   Patented Dec. 12, 1911.

Application filed June 8, 1911.   Serial No. 632,043.

*To all whom it may concern:*

Be it known that we, JOSEPH TORMA and JOHN F. ORTH, citizens of the United States, residing at East Pittsburgh, in the county of Allegheny and State of Pennsylvania, have invented certain new and useful Improvements in Headlight-Controlling Devices, of which the following is a specification.

This invention relates to head-light controlling devices for automobiles, or similar vehicles and aims to provide a device for this purpose which will be universal in its application and which will not necessitate alteration of any of the parts of the vehicle upon which it is mounted.

The invention aims further to provide a head-light controlling device which may be rendered inoperative at any time desired so that during the day, when the vehicle is in use, the head-light or lights will not be continuously shifted. This provides against unnecessary wear of the parts, and in this respect the invention presents advantages over similar devices heretofore proposed.

A further aim of the invention is to so construct the device that it will not be liable to become disarranged when the vehicle body is cushioned by the supporting springs.

For a full understanding of the invention reference is to be had to the following description and accompanying drawing, in which:—

Figure 1 is a perspective view of a portion of the front of an automobile showing the application of the invention thereto. Fig. 2 is a side elevation, parts being broken away, illustrating the invention. Fig. 3 is a detail plan view partly in section, of the device.

Corresponding and like parts are referred to in the following description and indicated in all the views of the accompanying drawing by the same reference characters.

In the drawings, the numeral 1 indicates the forepart of one of the side beams of the chassis frame of the automobile, 2 the front axle of the machine, 3 the steering knuckle, and 4 the usual rod which connects the knuckles of the two front wheel hubs, which rod extends in rear of the axle 2, and is shifted laterally to one side or the other in steering the machine.

A lamp support of the ordinary form indicated by the numeral 5 is mounted upon the chassis beam 4 and fitted for turning movement in the support is the stem 6 of a lamp supporting fork 7 which is of the ordinary type except that it is provided with a rearwardly extending arm 8.

The arms 8 of the two lamp supports are connected by means of a rod 9 so that the lamps will be shifted in unison. A rock-shaft 10 is mounted in a bearing bracket 11 secured by means of a clip 12 upon the axle 2 and as a connection between this shaft and the stem of the lamp support there is provided a connecting rod consisting of two telescopic members, one indicated by the numeral 13 and the other by the numeral 14, the member 13 being preferably rectangular in cross-section and fitting in the member 14. The member 14 has a universal joint connection at 15 with the upper end of the rock-shaft 10 and the member 13 has a universal joint connection as at 16 with the lower end of the stem 6 of the lamp support. At this point it will be readily understood that when the shaft 10 is rocked in either direction, corresponding turning movement will be imparted to the lamp support 6, thus for example, if the shaft 10 is turned to the right, the lamp support and the lamp mounted thereon, will be correspondingly turned.

An arm 17 is connected at one end, for free turning movement with the lower end of the rock-shaft 10 and projects rearwardly beneath the axle 2, and has pivoted to it at one end a link 18, the other end of this link being pivotally connected to a bracket 19 having a clip 20 which is clamped about the connecting rod 4 extending between the steering knuckles of the steering gear. It will be readily understood from the above that when the rod 4 is shifted, for example, to the left, for the purpose of steering the machine toward the right, the arm 17 will have its rear end swung also to the left, and should the arm be clutched with the rock-shaft 10 in a manner to be presently explained, the shaft will be correspondingly turned and the lamp supports will be turned in a direction to direct the rays of light in the line of travel of the machine.

As stated, the arm 17 is free to swing independently of the rock-shaft 10, but when the device is in actual use, the arm is to be clutched with the shaft so that operation of the steering gear would serve to impart movement to the lamp support, and the means provided for connecting the arm and shaft will now be described. A small barrel 21 is removably fitted to that end of the arm 17 which is connected with the lower end of the rock-shaft 10 and mounted in the barrel is a latch-pin 22 designed to engage at its inner end in a socket 23 formed in the said shaft. A collar 24 is fixed upon the latch-pin 22 and a spring 25 is arranged upon the pin and bears against the collar and against one end of the barrel 21. The pin is preferably provided at its outer end with a milled head 26 which may be grasped for the purpose of retracting the pin and also for the purpose of rotating it a part of a turn. A collar 27 fixed upon the pin 22 carries a stud 28 which is designed to engage against the outer end of the barrel 21 when the pin is retracted and rotated a slight degree in one direction or the other. The engagement of this stud 28 against the end of the barrel serves to hold the pin in retracted position and with its inner end out of engagement with the socket in the rock-shaft.

When the pin is retracted, the arm is free to swing without actuating the shaft 10, but when the pin is engaged at its free end in the socket in the shaft, the shaft is held from movement with the arm and the lamp supports are at such time automatically controlled by the movement of the rod 4 of the steering gear.

Having thus described the invention what is claimed as new is:—

1. In a head-light controlling device, a lamp support mounted for turning movement, a rock-shaft, connection between the rock-shaft and lamp support arranged to turn the latter when the shaft is rocked, a clip arranged for attachment to an element of the steering gear of a vehicle, an arm mounted for free swinging movement upon the rock-shaft, a link connecting the arm and clip, and a latch carried by the arm and engageable with the shaft to hold the shaft for movement with the arm.

2. In a head-light controlling device, a lamp support mounted for turning movement, a rock-shaft, connection between the rock-shaft and lamp support arranged to turn the latter when the shaft is rocked, a clip arranged for attachment to an element of the steering gear of a vehicle, an arm mounted for free swinging movement upon the rock-shaft, a link connecting the arm and clip, the shaft being formed with a socket, and a spring-pressed pin-latch carried by the arm, and engageable in the socket to hold the shaft for movement with the arm.

3. In a head-light controlling device, a lamp support mounted for turning movement, a rock-shaft, connection between the shaft and support comprising telescoping sections having universal joint connection, one with the shaft and the other with the support, and means connected with the shaft and arranged for connection with an element of the steering gear of a vehicle to hold the shaft for control by the movement of said element.

4. In a head-light controlling device, a lamp support mounted for turning movement, a rock-shaft, connection between the rock-shaft and lamp support arranged to turn the latter when the former is rocked, an arm upon the rockshaft for free swinging movement, a member connected with the arm and arranged for attachment to an element of the steering gear of a vehicle, the shaft being formed with a socket, a barrel carried by the arm, a latch-pin mounted in the barrel and engageable in the socket, a spring normally holding the pin in such engagement, the pin connecting the shaft for movement with the arm, and a stop upon the pin arranged to engage with one end of the barrel when the pin is retracted and turned, whereby to hold the pin out of such engagement in the socket.

In testimony whereof, we affix our signatures in presence of two witnesses.

JOSEPH TORMA. [L. S.]
JOHN F. ORTH. [L. S.]

Witnesses:
WALTER J. YENNY,
WM. G. PANNIER.

Copies of this patent may be obtained for five cents each, by addressing the "Commissioner of Patents, Washington, D. C."